3,045,019
PERIDICARBOXYLIC ACID IMIDE DYESTUFFS CONTAINING AT LEAST ONE ISOTHIOCYANATE GROUP

Hans Heinrich Bosshard and Heinrich Zollinger, Basel, Switzerland, assignors to Ciba Limited, Basel, Switzerland, a Swiss firm
No Drawing. Original application May 4, 1959, Ser. No. 812,574. Divided and this application June 21, 1960, Ser. No. 43,972
Claims priority, application Switzerland May 6, 1958
2 Claims. (Cl. 260—281)

This invention provides valuable new peridicarboxylic acid imide dyestuffs, which contain at least one acid group imparting solubility in water and at least on isothiocyanate group.

As acid groups imparting solubility in water there may be mentioned carboxylic acid groups and especially sulfonic acid groups. The isocyanate group or groups are advantageously aromatically bound.

The invention also provides a process for the manufacture of the aforesaid new dyestuffs, wherein a peridicarboxylic acid imide dystuff, which contains at least one acid group imparting solubility in water and at least one primary amino group, is treated to convert the primary amino group into an isothiocyanate group, for example, by reaction with thiophosgene.

As peridicarboxylic acid imide dyestuffs there are to be understood compounds which contain the grouping of the formula

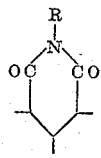

in which R stands for a hydrogen atom, an alkyl or aryl group. Of particular interest as starting materials are the perylene-tetracarboxylic acid imides of the formula

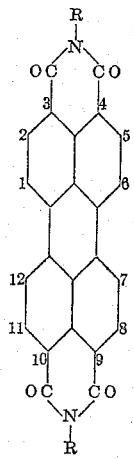

in which R stands for a benzene radical which contains at least one sulfonic acid group and a primary amino group.

The conversion of the amino group into the isothiocyanate group by the reaction (1) $R-NH_2 + CSCl_2 \rightarrow R-N=C=S + 2HCl$ is advantageously carried out in aqueous solution. Amino-sulfonic acids or amino-carboxylic acids are advantageously reacted in the form of sodium salts thereof and amines, which contain no groups imparting solubility in water, are advantageously reacted in an organic solvent.

One molecular proportion of thiophosgene is required for each primary amino group entering into reaction. However, it is of advantage to use a small excess, for example, about 10%, of thiophosgene. The reaction takes place at room temperature, but it is of advantage to heat the reaction mixture, advantageously at a temperature not exceeding 60° C. The isothiocyanate formed is advantageously precipitated from the reaction medium by the addition of a water-soluble inorganic salt, especially sodium chloride or sodium sulfate.

The conversion of the amino group into the isothiocyanate group can also be carried out by reacting the amine with carbon disulfide in the presence of an alkali metal hydroxide, ammonia or an amine to form the dithiocarbamate, for example, according to the reaction (2) $R-NH_2 + CS_2 + OH^\ominus \longrightarrow RNHCS-S^\ominus + H_2O$ dithiocarbamate The dithiocarbamate can be converted into the isothiocyanate by reaction with phosgene or sodium hypochlorite according to the equation (3) $RNHCS-S^\ominus + 4NaOCl + NaOH \rightarrow R-N=C=S + 3NaCl + Cl^\ominus + Na_2SO_4 + H_2O$ The reactions are advantageously carried out in an aqueous medium. In all the reactions it is of advantage to work at a low temperature, that is to say, between 0° C. and room temperature.

The dyestuffs so obtained can be isolated from the medium in which they are formed and, notwithstanding the presence of reactive groups, worked up into useful dry dyestuff preparations. The dyestuffs are advantageously isolated by filtration. The filtered dyestuffs may be dried, if desired, after the addition of a neutral or weakly alkaline extender. The drying is preferably carried out at not too high a temperature, that is to say, not higher than 50° C., and, if desired, under reduced pressure. The new dyestuffs are suitable for dyeing or printing a very wide variety of materials, such as animal fibers, for example, wool, or synthetic fibers, for example, nylon or polyvinyl alcohol fibers, and especially materials of natural or regenerated cellulose.

For this purpose it is of advantage to use aqueous solutions of the dyestuffs. These solutions advantageously contain a more or less neutral and preferably inorganic salt, such as an alkali metal chloride or sulfate, and if desired, an advantageously inorganic acid-binding agent, such as an alkali metal carbonate, alkali metal phosphate, alkali metal borate or perborate, or a mixture thereof, and especially a buffer mixture of such agents, and are used for dyeing in the cold or at a moderately raised temperature, or if a higher temperature, for example, at 60–80° C., if no alkali is present. During the dyeing process the isothiocyanate groups react with the polyhydroxylated material to be dyed, so that the dyestuff probably enters into chemical combination with the fiber.

In an advantageous form of the dyeing process the material to be dyed is impregnated at room temperature or a moderately raised temperature with an aqueous solution of the dyestuff, advantageously in the presence of an alkali or an agent yielding an alkali, such as sodium carbonate, and then the impregnated material is subjected to a heat treatment, advantageously in air at a temperature above 100° C. or in steam at 100° C. The impregnation may be carried out by the direct dyeing method or by printing or by the so-called pad dyeing method. Those dyestuffs of this invention which contain no groups imparting solubility in water can be used, for example, as pigments or can be condensed with hydroxylated compounds in the absence of water to form coloured artificial materials.

The present application is a division of copending application, Serial No. 812,574, filed May 4, 1959.

The following example illustrates the invention, the parts and percentages being by weight:

*Example 1*

2 parts of the dyestuff of the formula

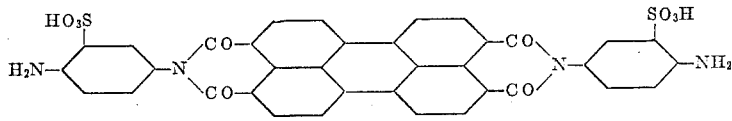

are dissolved as disodium salt in 200 parts of water at the boil. After cooling, the dyestuff solution is added slowly and with stirring at 20° C. to a mixture of 1 part of thiophosgene in 30 parts of water. The mixture is heated within one hour to 40° C. and maintained at that temperature for 6 hours. The hydrochloric acid liberated is neutralized by the addition of sodium carbonate at intervals. The reaction product is precipitated with sodium chloride, filtered, washed with acetone and dried on the filter by aspiration of air. When material is dyed as described in the following paragraph, a strong, bluish-red dyeing of good fastness to washing is obtained.

1 part of the dyestuff obtained as described in the preceding paragraph is dissolved in 2000 parts of water at 50° C. After adding 10 parts by volume of sodium hydroxide solution of 30% strength and 6 parts of sodium hydrosulfite, 50 parts of cotton are dyed in the so-obtained dye bath for 45 minutes with the addition of 60 parts of sodium chloride, the temperature of the bath being increased to 80° C. After dyeing, the cotton is washed, oxidized and soaped at the boil.

What is claimed is:

1. A peridicarboxylic acid diimide dyestuff of the formula

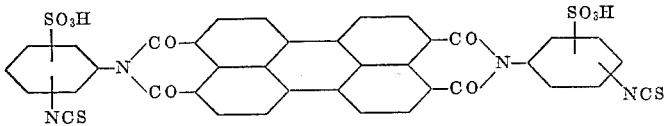

2. The dyestuff of the formula

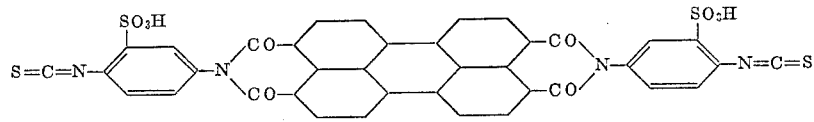

References Cited in the file of this patent

UNITED STATES PATENTS 2,409,851    Haddock _____ Oct. 22, 1946

OTHER REFERENCES

Karrer: "Organic Chemistry," 2nd ed., pp. 225–7 (1946).